Figure 1:
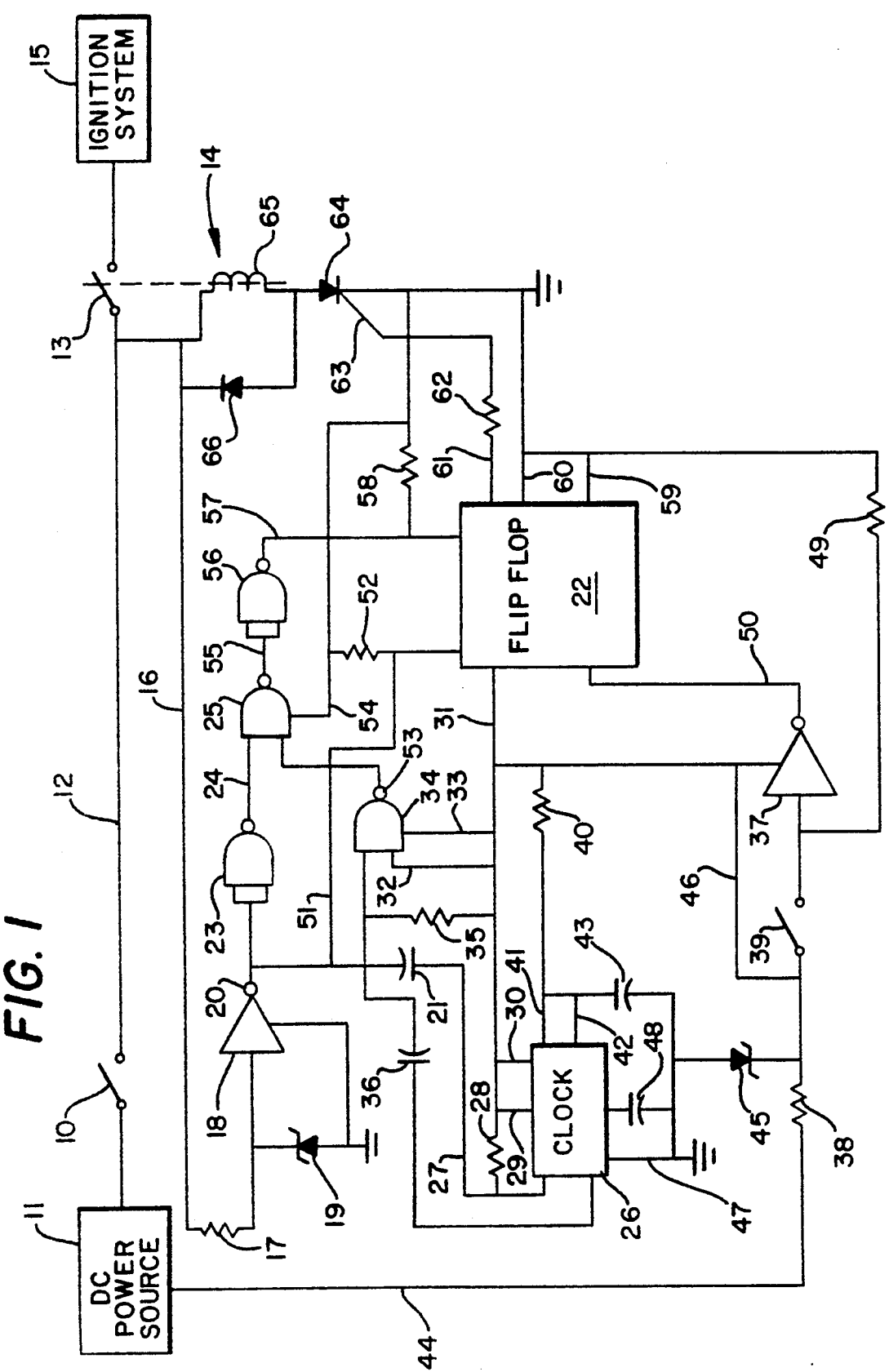

United States Patent [19]

Lima et al.

[11] Patent Number: 5,304,979
[45] Date of Patent: Apr. 19, 1994

[54] VEHICLE ANTITHEFT SYSTEM

[76] Inventors: Robert J. Lima, 3937 Townbluff, Plano; Jack F. Smith, 409 Ridgeview, Richardson, both of Tex. 75080

[21] Appl. No.: 910,730

[22] Filed: Jul. 8, 1992

[51] Int. Cl.$^5$ ............................................. B60R 25/10
[52] U.S. Cl. .................................. 340/428; 340/425.5; 340/426; 307/10.2; 307/10.3; 307/10.4
[58] Field of Search ...................... 340/425.5, 426, 541, 340/542, 428; 307/10.2, 10.3-10.6

[56] References Cited

U.S. PATENT DOCUMENTS 4,736,113  4/1988  Leu .......................................... 340/426
5,041,810  8/1991  Gotanda .................................. 340/426
5,218,338  6/1993  Chang ..................................... 340/426

Primary Examiner—Donnie L. Crosland
Attorney, Agent, or Firm—Warren H. Kintzinger

[57] ABSTRACT

A solid state computer circuit system is provided that senses the state of the ignition switch, setting a lock out circuit to prevent the car from being started if a hidden switch (or other enabling circuit) is not activated. There is a solid state timing circuit locking out the ignition system automatically after a predetermined time when the ignition switch is turned off (typically thirty seconds). The system is actuated with a hidden switch (or an electronic device like a garage door opener or a digital key pad with an alarm circuit sounding an alarm if the wrong code is input or a foreign item is used in an effort to wrongfully enable the basic system circuit).

7 Claims, 1 Drawing Sheet

VEHICLE ANTITHEFT SYSTEM

This invention relates in general to vehicle theft alarm and/or antitheft systems, and more particularly, to a solid state computer circuit system that senses the state of the ignition switch and sets a lock out circuit to prevent the vehicle from being started if a hidden switch is not activated.

Within the United States of America each year as many as one million vehicles are stolen and while many are recovered there are many inconveniences and frustrations involved. More than just an alarm system is needed since many theft alarm systems are quickly disarmed by the knowledgeable thief who still gets away with the vehicle. An ignition lockout circuit subject to activate within a predetermined time period, such as thirty seconds, if a hidden enabler switch (or other enabling circuit) is not activated would be most useful as an additional deterrant to vehicle theft.

It is therefore, a principle object of this invention to prevent vehicle theft.

Another object is to provide a vehicle ignition deactivating circuit having a hidden activation device (such as a hidden activation switch).

A further object is to provide such a vehicle ignition deactivating circuit that locks out the vehicle ignition system automatically after a predetermined time when the vehicle ignition switch is turned off.

Still another object is with such an ignition turn off deactivation circuit, supplemental to a vehicle alarm that may have been activated, to provide vehicle ignition circuit shut off.

Features of the invention useful in accomplishing the above objects include, in a vehicle antitheft system a solid state computer circuit that senses the state of the ignition switch, setting a lock out circuit to prevent the car from being started if a hidden switch (or other enabling circuit) is not activated. There is a solid state timing circuit locking out the ignition system automatically after a predetermined time when the ignition switch is turned off (typically thirty seconds). The system is actuated with a hidden switch or an electronic device like a garage door opener or a digital key pad with an alarm circuit sounding an alarm if the wrong code is input (or a foreign item is used in an effort to wrongfully enable the basic system circuit). This ignition system shutoff disable circuit is a useful supplement to theft alarm systems that may also be installed on a vehicle equipped with the vehicle antitheft ignition lock out circuit.

A specific embodiment representing what is presently regarded as the best mode of carrying out the invention is illustrated in the accompanying drawing.

In the drawing:

FIG. 1 is a block schematic showing of the subject vehicle antitheft circuit system ignition lockout circuit that senses the state of the vehicle ignition switch to prevent the car from being started if a hidden enabling switch is not activated.

Referring to the drawing:

The ignition switch 10 of a vehicle connects twelve volts dc from a battery power supply 11 to line 12 when closed. The line 12 is connected through switch 13 of relay 14, when closed to the balance of ignition system 15. Line 12 is also connected via line 16 through resistor 17 as an input to inverter circuit 18 with the input having a voltage bias limiting connection through zener diode 19 to ground with the inverter circuit 18 output 20 connected to capacitor 21, flip flop circuit 22, and as two inputs to "and" gate 23 having an output connection 24 to "or" gate 25. The capacitor 21 is connected to clock circuit 26 via line 27 and also through resistor 28 to two additional connections 29 and 30 to the clock circuit 26 on through line 31 to flip flop circuit 22 and through lines 32 and 33 as inputs to "or" circuit 34. The line 31 is also connected through resistor 35 as an additional input to "or" circuit 34 and also on through capacitor 36 as an input to clock circuit 26. In addition line 31 is connected to inverter circuit 37 and to the junction of resistor 38 and hidden manually operated switch 39, and also through resistor 40 to two clock circuit connections 41 and 42 and to capacitor 43 connected on the other side to ground. The battery power source 11 feeds twelve volts dc through line 44 and resistor 38 to the junction of zener diode 45, switch 39 and a line connection 46. There is a ground connection 47 and a capacitor 48 connection to ground from clock circuit 26 along with the connection of the anode of zener diode 45 to ground. The switch is, when closed, connected as an input to inverter circuit 37 and through resistor 49 to ground and the output line 50 from inverter circuit 37 is connected as an additional input to flip flop circuit 22. The line 51 connection from inverter circuit 18 output 20 to flip flop circuit 22 is connected through resistor 52 to ground. The output 53 of "or" gate 34 is connected as the second input of "or" gate 25 that has a ground connection 54 and an output connection 55 as two inputs to "and" gate 56 that has an output connection 57 as an input to flip flop circuit 22 and also through resistor 58 to ground. The flip flop circuit 22 has two ground connections 59 and 60 and an output connection 61 extended through resistor 62 to the control electrode 63 of silicon controlled rectifier 64 having a cathode connection to ground and an anode connection through switch 13 relay 14 coil 65 to line 12. A voltage limiting diode 66 is connected cathode to line 16 and anode to the junction of coil 65 and the silicon controlled rectifier (SCR) 64.

Various components along with some component values used in such a vehicle antitheft system circuit include:

| | |
|---|---|
| Inverter circuit 18 | 4050BF |
| "And" gates 23 and 56 | 4011BF |
| "Or" gates 25 and 34 | 4011BF |
| Flip flop 22 | 4013BF |
| Clock 26 | NE555 |
| Diode 66 | IN914 |
| Zener diode 19 and 45 | 9 V dc zener |
| Silicon controlled rectifier | 200 V PIU, 2 amp. |
| Resistor 17 | 270 Ohm 0.5 watt |
| Resistors 52, 58, 49 | 10–220 K Ohm 0.25 watt |
| Resistors 35, 62 | 1,000 Ohm 0.25 watt |
| Resistor 28 | 7,500 Ohm 0.25 watt |
| Resistor 38 | 50 Ohm 0.5 watt |
| Capacitors 21, 36, 48 | 0.01 50 volt dc |
| Relay 14 | 12 volt dc SPDT relay |

Operation of the vehicle antitheft system circuit of FIG. 1 includes, when the vehicle's switch 10 is closed application of voltage at the input of inverter circuit 18 the output of which is applied to flip flop circuit 22 setting the flip flop to a set condition. The enable signal out of inverter circuit 18 is also applied to dual inputs of "and" circuit 23 to block any disable signal from clock timer circuit 26 from reaching the reset pin connect of line 57 to flip flop 22. Capacitor 21 is also charged by the output of inverter circuit 18. Then when the hidden switch 39, or other enable device, is momentarily closed, a high level voltage state is placed on the input of inverter circuit 37 and a resultant high level state appears at the output of inverter circuit 37 that is applied as an enabling input to flip flop circuit 22 to turn on output 61 of the flip flop circuit 22. This signal level on output 61 turns on SCR 64 thereby energising the relay 14 closing switch 13 to energise the car ignition system 15. When ignition switch 10 is opened to turn off the vehicle the voltage level on the input of inverter circuit 18 is lowered and the resultant output signal is lowered causing capacitor 21 to discharge enabling the clock timer circuit 26 to start its time cycle. When the ignition switch 10 is turned off power to relay 14 coil 65 is removed and the relay 14 deenergizes and with no current through coil 65 the silicon controlled rectifier (SCR) 64 is reset. Then when the clock timer circuit 26 time cycle is started a high voltage level state pulse is placed on the timer circuit 26 terminal connection connected to capacitor 36 that discharges with that connection going to a low state at the end of the time cycle resulting in a voltage pulse being applied to the input to "or" gate 34. A resultant pulse continues through the logic circuitry including "or" gates 34 and 25, now enabled by the low level state signal on the two inputs of "and" gate 23, to the output of "and" gate 56, and on the reset terminal of flip flop 22. When a reset pulse is present on the reset terminal of flip flop 22 it resets the flip flop 22 and turns off SCR 64. If the ignition switch 10 is turned on before the reset pulse is sent from the clock timer circuit 26 to reset on flip flop 22, acting through logic circuitry "or" gate 34 through "or" gate 25 blocks the reset pulse and SCR 64 will be turned back on energizing the coil 65 of relay 14 thereby applying power, with switch 13 closed, to ignition system 15. The resistor 40 and capacitor 43 are components of the time constant circuit with the clock timer circuit 26 determining the length of the system time cycle. The ziner diodes 19 and 45 clip voltage spikes to prevent overvoltage circuit damage or any false trigger signals. Resistors 35 and 62 provide isolation between components and resistors 52, 58, and 49 are used as voltage bias resistors for various respective points in the logic circuitry of the system.

Whereas this invention has been described with respect to a preferred embodiment thereof, it should be realized that various changes may be made without departure from the essential contributions to the art made by the teachings hereof.

I claim:

1. A vehicle antitheft ignition lock out circuit comprising: a dc power source; a vehicle ignition system; a line from dc power source to said vehicle ignition system; an ignition switch in said line and an ignition cut off relay switch in said line; a relay having a relay coil and a solenoid core connected to said ignition cut off relay switch for opening and closing said ignition cut off relay switch with activation and deactivation of said relay; circuit path means connected to said line between said ignition switch and said ignition cut off relay switch as a dc power source, when said ignition switch is closed, for said relay coil; and control circuit means including control switch means for activating a current on-off dc conduction device controlling on-off conduction of dc current through said current on-off dc conduction device; wherein said current on-off dc conduction device is a silicon controlled rectifier having anode connection to said relay coil, a cathode connection to a voltage potential reference source, and a control electrode connected to said control circuit means; said ignition cut off relay switch is a normally open switch that is closed for through flow of dc to said vehicle ignition upon initiation of current flow through said relay coil; said control switch means is a normally open switch circuit connected to said dc power source; and with said normally open switch connected through intervening circuit means to a flip flop control means circuit having a controlling output connection to said control electrode of said silicon controlled rectifier for controlled setting of said silicon controlled rectifier when said control switch means is closed transmitting a voltage signal state to said flip flop control means circuit; said intervening circuit means includes an inverter circuit; said control switch means is located in a hidden non obtrusive place in the vehicle; and wherein a logic circuit is connected to said line from dc power source to said vehicle ignition system between said ignition switch and said ignition cut off relay switch; said logic circuit inverter circuit having an output connection to a capacitor also connected to a timing circuit activating terminal; said logic circuit inverter circuit output also being connected to a set input terminal of said flip flop control circuit means, and to two inputs of an "and" circuit in logic circuitry of said control circuitry; and with the said flip flop control circuit means in the set state said control switch means when closed passing a signal through intervening circuitry to an enable terminal of said flip flop control circuit means to produce an output to the control electrode of said silicon controlled rectifier for current flow therethrough and through the relay coil for closing of said relay switch.

2. The vehicle antitheft ignition lock out circuit of claim 1, wherein said timing circuit has an output terminal connection circuit connected to an input of a first "or" gate having an output connection to a second "or" gate in said logic circuitry with an output connection through intervening circuitry to a reset input terminal of said flip flop control circuit means for reset of the flip flop circuit and turn off removal of activating voltage from said control electrode of said silicon controlled rectifier.

3. The vehicle antitheft ignition lock out circuit of claim 2, wherein said intervening circuitry to a reset input terminal of said flip flop control circuit means for reset of the flip flop circuit includes an "and" gate.

4. The vehicle antitheft ignition lock out circuit of claim 3, wherein said "and" circuit in logic circuitry of said control circuitry output connected as an input to said second "or" gate so as to, when the ignition switch is turn on closed before a reset pulse is originated by said timer circuit this delayed in time reset pulse is blocked by the two "or" gate logic circuitry and current again flows through said relay coil and said silicon controlled rectifier.

5. The vehicle antitheft ignition lock out circuit of claim 4, wherein a capacitor is connected between said timer circuit and voltage potential reference source; and resistive means is connected between said timer circuit and said dc power source with said capacitor and said resistive means are value selected for setting a desired cycle time period of said timer circuit.

6. The vehicle antitheft ignition lock out circuit of claim 5, wherein said resistive means includes two resistors with the junction of the two resistors connected through a zener diode to a voltage potential reference source with the anode of the zener diode connected to said voltage potential reference source.

7. The vehicle antitheft ignition lock out circuit of claim 6, wherein said resistive means and said capacitor are value selected for the timer to have approximately a thirty second time cycle time period.

* * * * *